US011120496B2

(12) United States Patent
Carroll

(10) Patent No.: US 11,120,496 B2
(45) Date of Patent: Sep. 14, 2021

(54) PROVIDING AUGMENTED REALITY USER INTERFACES AND CONTROLLING BACK-OFFICE DATA PROCESSING SYSTEMS BASED ON AUGMENTED REALITY EVENTS

(71) Applicant: Bank of America Corporation, Charlotte, NC (US)

(72) Inventor: Matthew E. Carroll, Charlotte, NC (US)

(73) Assignee: Bank of America Corporation, Charlotte, NC (US)

(*) Notice: Subject to any disclaimer, the term of this patent is extended or adjusted under 35 U.S.C. 154(b) by 232 days.

(21) Appl. No.: 16/123,019

(22) Filed: Sep. 6, 2018

(65) Prior Publication Data

US 2020/0082463 A1 Mar. 12, 2020

(51) Int. Cl.
  *G06Q 30/06* (2012.01)
  *G06T 19/00* (2011.01)
  *G06F 40/40* (2020.01)

(52) U.S. Cl.
  CPC ......... *G06Q 30/0643* (2013.01); *G06F 40/40* (2020.01); *G06Q 30/0623* (2013.01); *G06T 19/006* (2013.01)

(58) Field of Classification Search
  None
  See application file for complete search history.

(56) References Cited

U.S. PATENT DOCUMENTS

| 6,083,270 | A  | 7/2000  | Scott       |
|-----------|----|---------|-------------|
| 6,945,457 | B1 | 9/2005  | Barcelou    |
| 7,305,691 | B2 | 12/2007 | Cristofalo  |
| 9,100,493 | B1 | 8/2015  | Zhou et al. |

(Continued)

OTHER PUBLICATIONS

D. Brown, S. Julier, Y. Baillot and M. A. Livingston, "An event-based data distribution mechanism for collaborative mobile augmented reality and virtual environments," IEEE Virtual Reality, 2003. Proceedings., 2003, pp. 23-29, doi: 10.1109/VR.2003.1191117 (Year: 2003).*

*Primary Examiner* — Michelle T Kringen
(74) *Attorney, Agent, or Firm* — Banner & Witcoff, Ltd.; Michael A. Springs

(57) ABSTRACT

Aspects of the disclosure relate to providing augmented reality user interfaces and controlling back-office data processing systems based on augmented reality events. A computing platform may receive first item information identifying one or more items associated with a first event participant and second item information identifying one or more items associated with a second event participant. Subsequently, the computing platform may generate an event summary user interface that includes one or more augmented reality overlay elements and may send the event summary user interface to devices associated with the first and second event participants. In response to receiving event conclusion information indicating the ending of the event involving the first and second event participants, the computing platform may generate one or more event processing commands directing enterprise institution server infrastructure to execute one or more sub-events and may send the commands to the enterprise institution server infrastructure for execution.

20 Claims, 11 Drawing Sheets

(56) References Cited

U.S. PATENT DOCUMENTS

| | | | |
|---|---|---|---|
| 9,547,960 B2 | 1/2017 | Thomas et al. | |
| 9,575,563 B1 * | 2/2017 | Li | G06F 3/038 |
| 9,710,804 B2 | 7/2017 | Zhou et al. | |
| 9,792,594 B1 | 10/2017 | Bayha et al. | |
| 2014/0330654 A1 * | 11/2014 | Turney | G06Q 20/102 |
| | | | 705/15 |
| 2017/0317834 A1 | 11/2017 | Smith et al. | |
| 2017/0317997 A1 | 11/2017 | Smith et al. | |
| 2017/0324726 A1 | 11/2017 | Alleaume et al. | |
| 2017/0330250 A1 | 11/2017 | Arjomand et al. | |
| 2017/0345105 A1 | 11/2017 | Isaacson et al. | |
| 2017/0346851 A1 | 11/2017 | Drake | |
| 2017/0359328 A1 | 12/2017 | Jones-McFadden et al. | |
| 2018/0019984 A1 | 1/2018 | Isaacson et al. | |
| 2018/0025334 A1 | 1/2018 | Pourfallah et al. | |
| 2018/0032997 A1 | 2/2018 | Gordon et al. | |
| 2018/0060606 A1 | 3/2018 | Dascola et al. | |
| 2018/0062764 A1 | 3/2018 | Borrill | |
| 2018/0075694 A1 | 3/2018 | Frolov et al. | |
| 2018/0089706 A1 | 3/2018 | Li | |
| 2018/0089735 A1 | 3/2018 | Lenahan et al. | |
| 2018/0096362 A1 | 4/2018 | Kwan | |
| 2018/0102018 A1 | 4/2018 | Cage et al. | |
| 2018/0103047 A1 | 4/2018 | Turgeman et al. | |
| 2018/0107816 A1 | 4/2018 | Wu et al. | |
| 2018/0114127 A1 | 4/2018 | Cole et al. | |
| 2018/0114262 A1 | 4/2018 | Sanjeevaiah Krishnaiah | |
| 2018/0115899 A1 | 4/2018 | Kedem et al. | |
| 2018/0144112 A1 | 5/2018 | Pitel et al. | |
| 2018/0150812 A1 | 5/2018 | Kurian et al. | |
| 2018/0152835 A1 | 5/2018 | Kurian et al. | |
| 2018/0157336 A1 | 6/2018 | Harris et al. | |
| 2018/0158036 A1 | 6/2018 | Zhou et al. | |
| 2018/0160309 A1 | 6/2018 | Turgeman et al. | |
| 2018/0165914 A1 | 6/2018 | Sternberg et al. | |
| 2018/0165921 A1 | 6/2018 | Kurian et al. | |
| 2018/0165977 A1 | 6/2018 | Johansen et al. | |
| 2018/0165984 A1 | 6/2018 | Waldron et al. | |
| 2018/0174134 A1 | 6/2018 | Carpenter et al. | |
| 2018/0181934 A1 | 6/2018 | Baig et al. | |
| 2018/0181997 A1 | 6/2018 | Sanjeevaiah Krishnaiah et al. | |
| 2018/0204111 A1 | 7/2018 | Zadeh et al. | |
| 2018/0204174 A1 | 7/2018 | Soon-Shiong | |
| 2018/0204382 A1 | 7/2018 | Simpson | |
| 2018/0211718 A1 | 7/2018 | Heath | |
| 2018/0216946 A1 | 8/2018 | Gueye | |
| 2018/0225754 A1 | 8/2018 | Del Vecchio et al. | |
| 2018/0232522 A1 | 8/2018 | Shear et al. | |
| 2018/0232535 A1 | 8/2018 | Lovin | |
| 2018/0232716 A1 | 8/2018 | Conforti | |
| 2018/0232817 A1 | 8/2018 | Isaacson et al. | |
| 2018/0234496 A1 | 8/2018 | Ratias | |
| 2018/0240259 A1 | 8/2018 | Zamer | |
| 2018/0241727 A1 | 8/2018 | Verzun et al. | |
| 2018/0247191 A1 | 8/2018 | Katz et al. | |
| 2018/0247483 A1 | 8/2018 | Lindsay | |
| 2020/0066046 A1 * | 2/2020 | Stahl | G06T 19/006 |

* cited by examiner

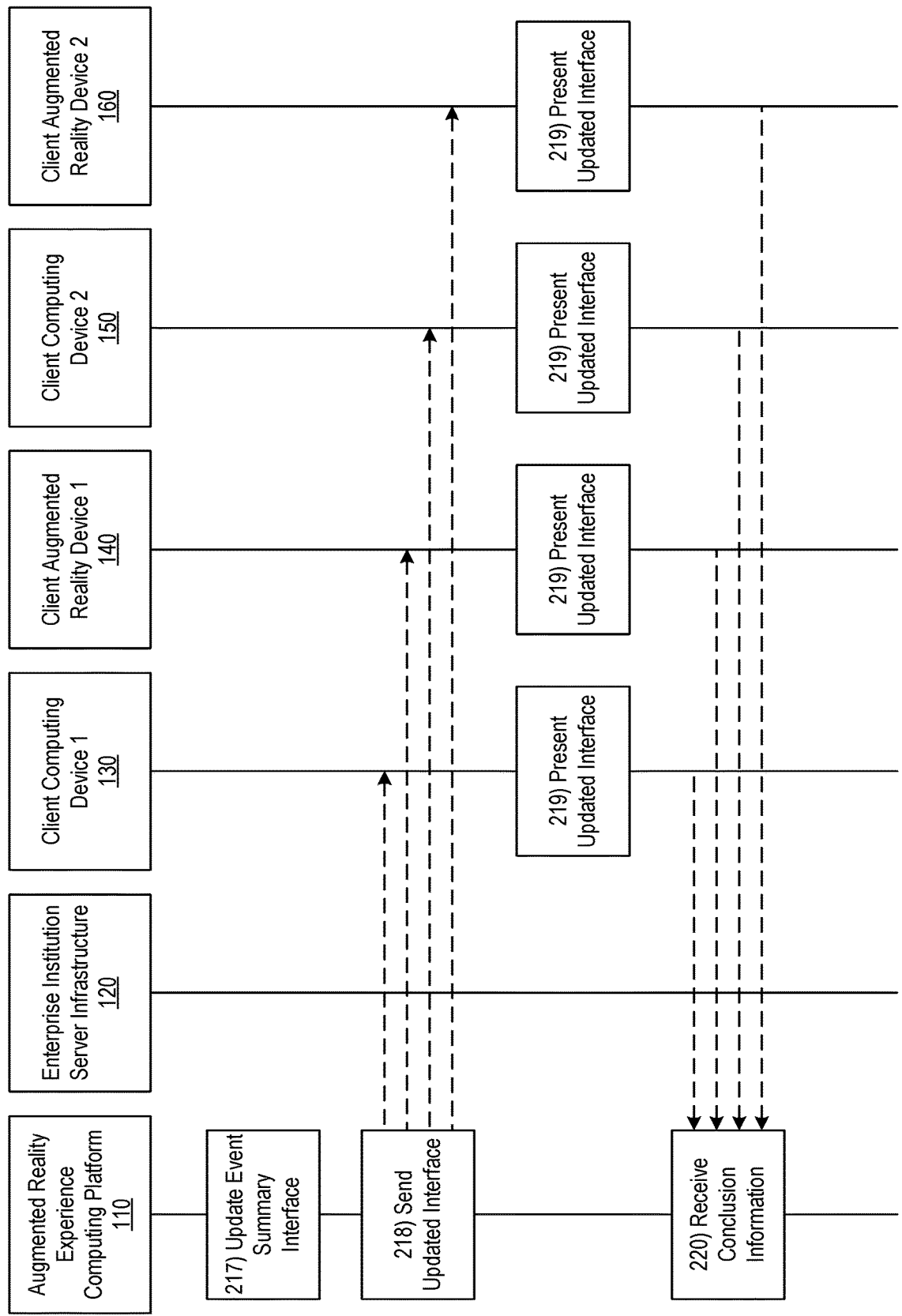

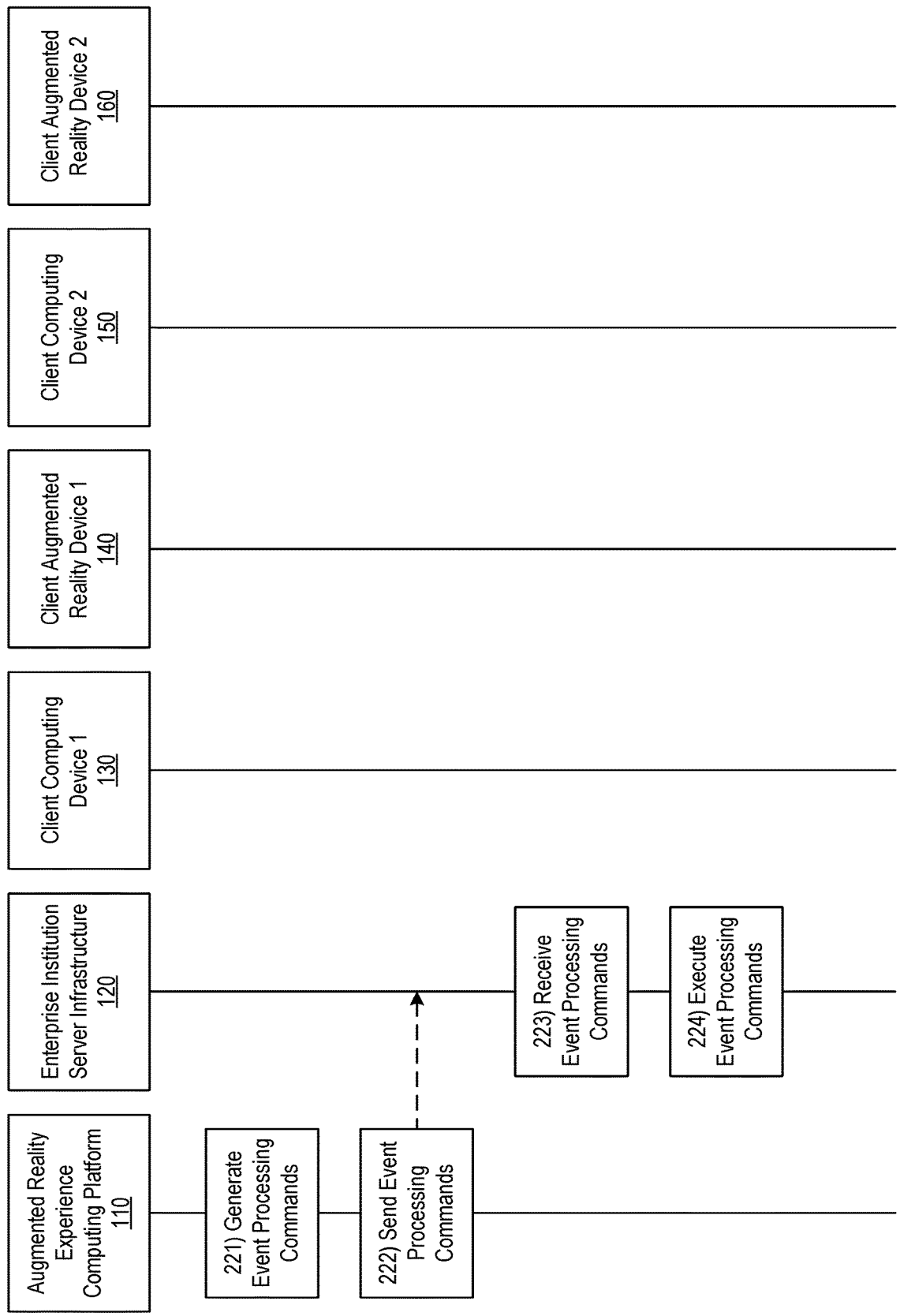

PROVIDING AUGMENTED REALITY USER INTERFACES AND CONTROLLING BACK-OFFICE DATA PROCESSING SYSTEMS BASED ON AUGMENTED REALITY EVENTS

BACKGROUND

Aspects of the disclosure relate to data processing, augmented reality interfaces and devices, and control systems. In particular, one or more aspects of the disclosure relate to providing augmented reality user interfaces and controlling back-office data processing systems based on augmented reality events.

Organizations increasingly provide electronic portals, mobile applications, and other electronic tools via which various users may access, view, and/or modify information, including client information. Increasing the functionality available via such electronic tools while also ensuring the safety and security of information maintained by organization systems and/or made available via such tools is increasingly important. In many instances, however, it may be difficult to optimize for increased functionality, information security, and efficient and effective technical operations of the computer systems that maintain such information and/or support such electronic tools.

SUMMARY

Aspects of the disclosure provide effective, efficient, scalable, and convenient technical solutions that address and overcome the technical problems associated with deploying and maintaining electronic portals, mobile applications, and other electronic tools by providing augmented reality user interfaces and controlling back-office data processing systems based on augmented reality events.

In accordance with one or more embodiments, a computing platform having at least one processor, a communication interface, and memory may receive, via the communication interface, from at least one client device associated with a first event participant, first item information identifying one or more items associated with the first event participant. In addition, the computing platform may receive, via the communication interface, from at least one client device associated with a second event participant, second item information identifying one or more items associated with the second event participant. Subsequently, the computing platform may generate at least one event summary user interface based on the first item information identifying the one or more items associated with the first event participant and the second item information identifying the one or more items associated with the second event participant. Then, the computing platform may send, via the communication interface, to the at least one client device associated with the first event participant and the at least one client device associated with the second event participant, the at least one event summary user interface. Further, the at least one event summary user interface may include one or more augmented reality overlay elements.

Thereafter, the computing platform may receive, via the communication interface, from one or more of the at least one client device associated with the first event participant and the at least one client device associated with the second event participant, event conclusion information indicating an ending of an event involving the first event participant and the second event participant. In response to receiving the event conclusion information indicating the ending of the event involving the first event participant and the second event participant, the computing platform may generate one or more event processing commands directing enterprise institution server infrastructure to execute one or more sub-events. Subsequently, the computing platform may send, via the communication interface, to the enterprise institution server infrastructure, the one or more event processing commands directing the enterprise institution server infrastructure to execute the one or more sub-events.

In some embodiments, receiving the first item information identifying the one or more items associated with the first event participant from the at least one client device associated with the first event participant may include receiving a first portion of the first item information from a client computing device associated with the first event participant and receiving a second portion of the first item information from an augmented reality device associated with the first event participant.

In some embodiments, receiving the second item information identifying the one or more items associated with the second event participant from the at least one client device associated with the second event participant may include receiving a first portion of the second item information from a client computing device associated with the second event participant and receiving a second portion of the second item information from an augmented reality device associated with the second event participant.

In some embodiments, sending the at least one event summary user interface to the at least one client device associated with the first event participant and the at least one client device associated with the second event participant may cause at least one augmented reality device to display the one or more augmented reality overlay elements associated with the at least one event summary user interface on top of one or more real-world visual elements.

In some embodiments, sending the at least one event summary user interface to the at least one client device associated with the first event participant and the at least one client device associated with the second event participant may include synchronizing user interactions made on different devices by updating the at least one event summary user interface in real-time.

In some embodiments, the at least one event summary user interface may include one or more common elements and one or more participant-specific elements.

In some embodiments, generating the one or more event processing commands directing the enterprise institution server infrastructure to execute the one or more sub-events may include generating the one or more event processing commands based on first event information received from the at least one client device associated with the first event participant and second event information received from the at least one client device associated with the second event participant.

In some embodiments, prior to receiving the first item information identifying the one or more items associated with the first event participant, the computing platform may receive, via the communication interface, from the at least one client device associated with the first event participant, an event pre-staging request. In response to receiving the event pre-staging request from the at least one client device associated with the first event participant, the computing platform may generate a pre-staging interface for the at least one client device associated with the first event participant. Subsequently, the computing platform may send, via the communication interface, to the at least one client device associated with the first event participant, the pre-staging interface generated for the at least one client device associated with the first event participant.

In some embodiments, receiving the first item information identifying the one or more items associated with the first event participant may include receiving information identifying at least one item that was captured and identified by the at least one client device associated with the first event participant using an integrated camera. In some embodiments, receiving the first item information identifying the one or more items associated with the first event participant may include receiving information identifying at least one item that was captured and identified by the at least one client device associated with the first event participant using natural language processing.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which:

FIGS. 2A-2F depict an illustrative event sequence for providing augmented reality user interfaces and controlling back-office data processing systems based on augmented reality events in accordance with one or more example embodiments;

DETAILED DESCRIPTION

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

Some aspects of the disclosure relate to utilizing augmented reality (AR) technology in person-to-person payments, particularly in check-splitting use cases. For example, an AR-enabled device, such as AR-enabled glasses, may present an AR interface to a user in a restaurant setting, and the interface may include information identifying how much the check is. The AR device may utilize a built-in camera or linked smartphone's camera to identify who else is at the table, what each person ordered and/or consumed, and may use this information to automatically split the check and facilitate all necessary person-to-person (P2P) transactions. In some arrangements, the AR interface may include a view of the receipt, and a user may "grab" three-dimensional (3D) representations of items that they ordered, pull them from a group of items in the center of the table onto their plate, and generate a customized receipt for completing their own individual payment. The user also may be able to sort items into different payment transactions (e.g., food may be purchased on the user's corporate card, while drinks may be purchased on the user's personal card, or the like).

Figure 1A:
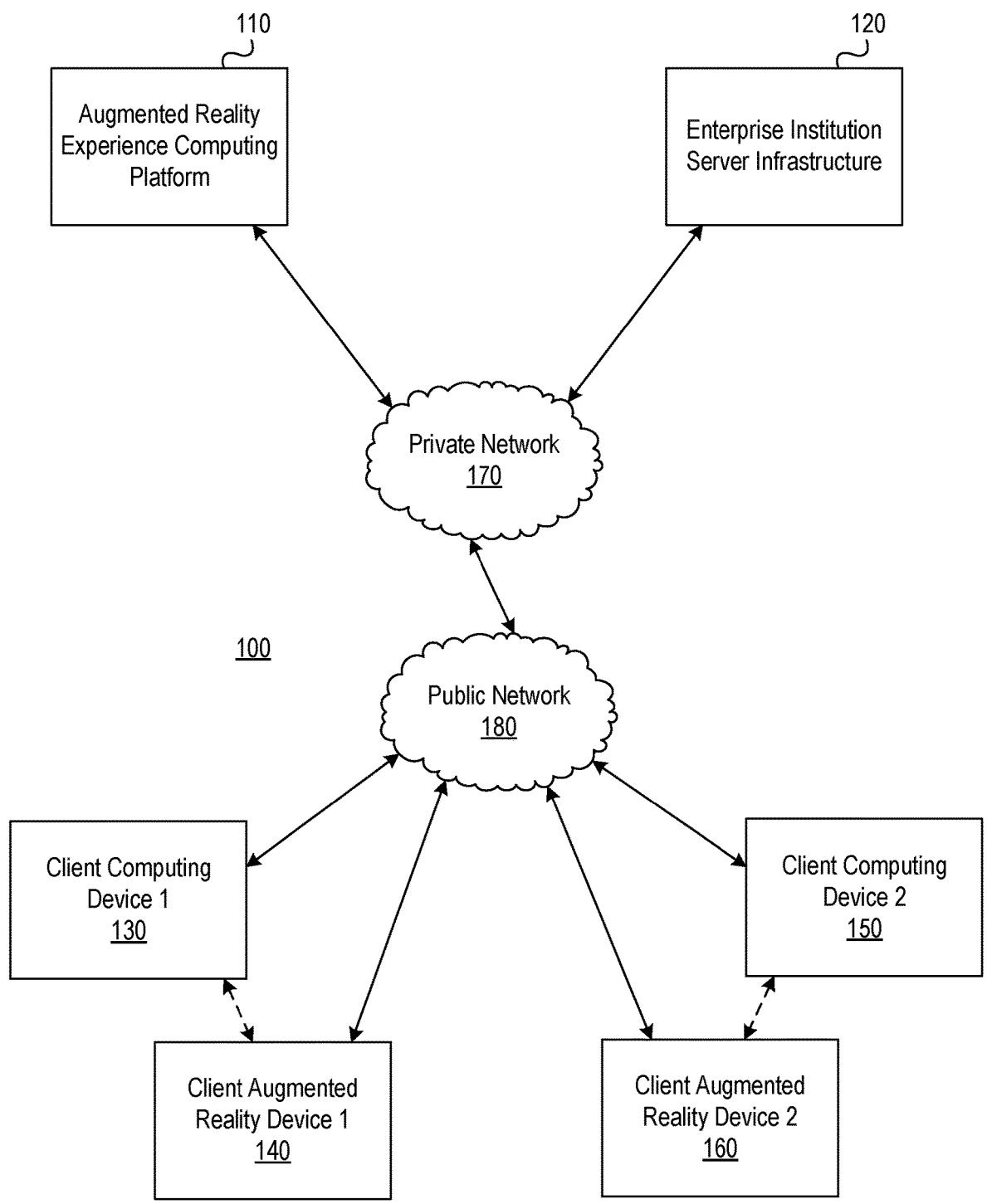
FIGS. 1A and 1B depict an illustrative computing environment for providing augmented reality user interfaces and controlling back-office data processing systems based on augmented reality events in accordance with one or more example embodiments.
Figure 1B:
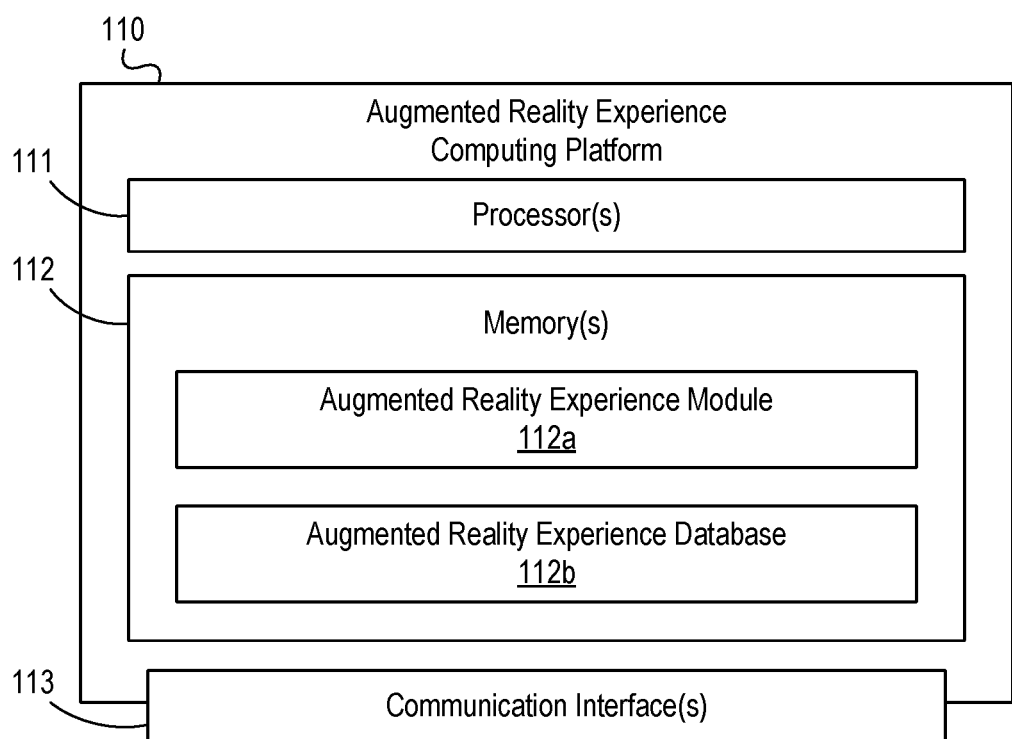

FIGS. 1A and 1B depict an illustrative computing environment for providing augmented reality user interfaces and controlling back-office data processing systems based on augmented reality events in accordance with one or more example embodiments. Referring to FIG. 1A, computing environment 100 may include one or more computer systems. For example, computing environment 100 may include an augmented reality experience computing platform 110, enterprise institution server infrastructure 120, a first client computing device 130, a first client augmented reality device 140, a second client computing device 150, and a second client augmented reality device 160.

As illustrated in greater detail below, augmented reality experience computing platform 110 may include one or more computing devices configured to perform one or more of the functions described herein. For example, augmented reality experience computing platform 110 may include one or more computers (e.g., laptop computers, desktop computers, servers, server blades, or the like).

Enterprise institution server infrastructure 120 may include a plurality of servers, and each of these servers may include one or more computing devices and/or other computer components (e.g., processors, memories, communication interfaces). In addition, and as illustrated in greater detail below, enterprise institution server infrastructure 120 may be configured to maintain user information (e.g., user activity information, user profile information, and/or the like), execute and/or otherwise process event processing commands (which may, e.g., include initiating, executing, and/or otherwise processing payment transactions, such as P2P payment transactions), and/or perform other enterprise functions (which may, e.g., include performing account management functions and/or other functions). Additionally or alternatively, enterprise institution server infrastructure 120 may be configured to process and/or execute financial events associated with particular accounts, for instance, by updating its own databases, by writing data to other databases, and/or by commanding and/or controlling other systems and/or devices. In some instances, one or more financial events may be or correspond to a transfer of funds from one account to another, a money transfer associated with an estate, a transaction associated with a group or joint account (e.g., an investment club account), an endorsement for a joint account, a contractual agreement, a mortgage loan documentation requirement or transaction, or the like. In some instances, one or more events may be defined via a client portal provided by enterprise institution server infrastructure 120 and/or one or more other systems and/or devices included in computing environment 100. Such a client portal may be hosted by an organization, and may be an online banking portal or a mobile banking portal provided by a financial institution. In addition, such a portal may, for instance, provide customers of the financial institution with access to financial account information (e.g., account balance information, account statements, recent transaction history information, or the like) and/or may provide customers of the financial institution with menus, controls, and/or other options to schedule and/or execute various transactions (e.g., online bill pay transactions, person-to-person funds transfer transactions, or the like).

Client computing device 130 may be a personal computing device (e.g., desktop computer, laptop computer) or mobile computing device (e.g., smartphone, tablet) that may be linked to and/or used by a first user (who may, e.g., be a customer of an enterprise organization, such as a financial institution). Client augmented reality device 140 may be an augmented reality computing device and/or display device that may be linked to the first user and/or connected to client computing device 130 (e.g., via a wired connection and/or via a wireless connection). In some instances, client augmented reality device 140 may be a headset-style augmented reality device (e.g., AR glasses) while in other instances, client augmented reality device 140 may be another type of augmented reality device or the like.

Client computing device 150 may be a personal computing device (e.g., desktop computer, laptop computer) or mobile computing device (e.g., smartphone, tablet) that may be linked to and/or used by a second user (who may, e.g., be a customer of an enterprise organization, such as a financial institution). Client augmented reality device 160 may be an augmented reality computing device and/or display device that may be linked to the second user and/or connected to client computing device 150 (e.g., via a wired connection and/or via a wireless connection). In some instances, client augmented reality device 160 may be a headset-style augmented reality device (e.g., AR glasses) while in other instances, client augmented reality device 160 may be another type of augmented reality device or the like.

Computing environment 100 also may include one or more networks, which may interconnect one or more of augmented reality experience computing platform 110, enterprise institution server infrastructure 120, client computing device 130, client augmented reality device 140, client computing device 150, and client augmented reality device 160. For example, computing environment 100 may include a private network 170 (which may, e.g., interconnect augmented reality experience computing platform 110, enterprise institution server infrastructure 120, and/or one or more other systems, devices, and/or networks associated with an organization operating augmented reality experience computing platform 110 and/or enterprise institution server infrastructure 120) and public network 180 (which may, e.g., interconnect client computing device 130, client augmented reality device 140, client computing device 150, client augmented reality device 160, and/or one or more other systems, public networks, sub-networks, and/or the like).

In one or more arrangements, client computing device 130, client computing device 150, and/or the other systems included in computing environment 100 may be any type of computing device capable of receiving a user interface, receiving input via the user interface, and communicating the received input to one or more other computing devices. For example, client computing device 130, client computing device 150, and/or the other systems included in computing environment 100 may, in some instances, be and/or include server computers, desktop computers, laptop computers, tablet computers, smart phones, or the like that may include one or more processors, memories, communication interfaces, storage devices, and/or other components. As noted above, and as illustrated in greater detail below, any and/or all of augmented reality experience computing platform 110, enterprise institution server infrastructure 120, client computing device 130, client augmented reality device 140, client computing device 150, and client augmented reality device 160 may, in some instances, be special-purpose computing devices configured to perform specific functions.

Referring to FIG. 1B, augmented reality experience computing platform 110 may include one or more processors 111, memory 112, and communication interface 113. A data bus may interconnect processor 111, memory 112, and communication interface 113. Communication interface 113 may be a network interface configured to support communication between augmented reality experience computing platform 110 and one or more networks (e.g., network 170, network 180, or the like). Memory 112 may include one or more program modules having instructions that when executed by processor 111 cause augmented reality experience computing platform 110 to perform one or more functions described herein and/or one or more databases that may store and/or otherwise maintain information which may be used by such program modules and/or processor 111. In some instances, the one or more program modules and/or databases may be stored by and/or maintained in different memory units of augmented reality experience computing platform 110 and/or by different computing devices that may form and/or otherwise make up augmented reality experience computing platform 110. For example, memory 112 may have, store, and/or include an augmented reality experience module 112*a* and an augmented reality experience database 112*b*. Augmented reality experience module 112*a* may have instructions that direct and/or cause augmented reality experience computing platform 110 to provide augmented reality user interfaces and control back-office data processing systems based on augmented reality events, as discussed in greater detail below. Augmented reality experience database 112*b* may store information used by augmented reality experience module 112*a* and/or augmented reality experience computing platform 110 in providing augmented reality user interfaces and controlling back-office data processing systems based on augmented reality events and/or in performing other functions.

Figure 2A:
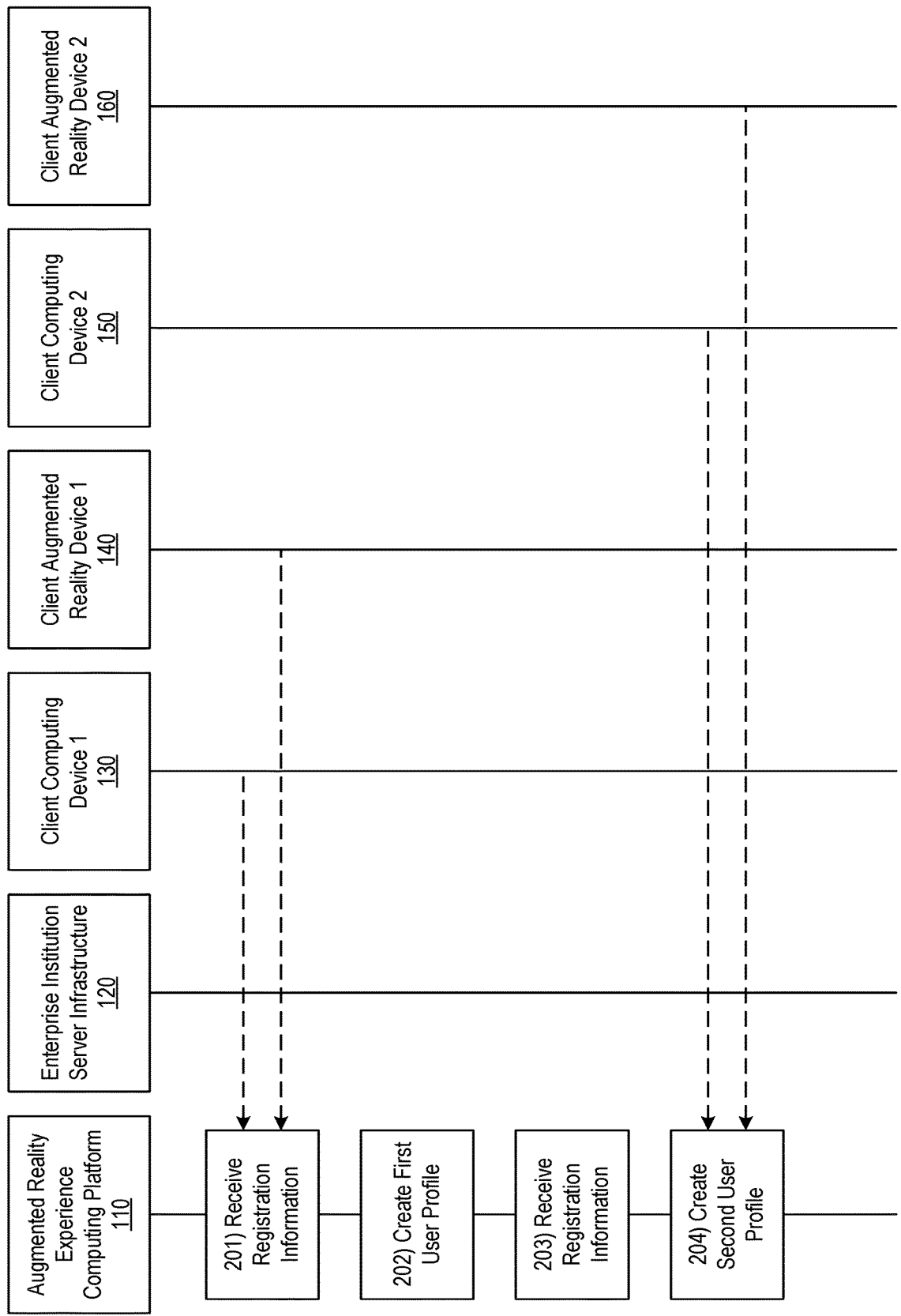

FIGS. 2A-2F depict an illustrative event sequence for providing augmented reality user interfaces and controlling back-office data processing systems based on augmented reality events in accordance with one or more example embodiments. Referring to FIG. 2A, at step 201, augmented reality experience computing platform 110 may receive registration information from client computing device 130 and/or client augmented reality device 140. For instance, augmented reality experience computing platform 110 may receive registration information identifying a specific user associated with client computing device 130 and/or client augmented reality device 140, user account information and/or user profile information associated with client computing device 130 and/or client augmented reality device 140 (e.g., language preferences, location preferences, and/or the like), one or more unique identifiers associated with client computing device 130 and/or client augmented reality device 140 (e.g., device serial numbers, globally unique identifiers, and/or the like), and/or other information associated with client computing device 130 and/or client augmented reality device 140. At step 202, augmented reality experience computing platform 110 may create a first user profile. For example, at step 202, augmented reality experience computing platform 110 may create a first user profile by storing and/or updating one or more records that include any and/or all of the registration information received from client computing device 130 and/or client augmented reality device 140.

At step 203, augmented reality experience computing platform 110 may receive registration information from client computing device 150 and/or client augmented reality device 160. For instance, augmented reality experience computing platform 110 may receive registration information identifying a specific user associated with client computing device 150 and/or client augmented reality device 160, user account information and/or user profile information associated with client computing device 150 and/or client augmented reality device 160 (e.g., language preferences, location preferences, and/or the like), one or more unique identifiers associated with client computing device 150 and/or client augmented reality device 160 (e.g., device serial numbers, globally unique identifiers, and/or the like), and/or other information associated with client computing device 150 and/or client augmented reality device 160. At step 204, augmented reality experience computing platform 110 may create a second user profile. For example, at step 204, augmented reality experience computing platform 110 may create a second user profile by storing and/or updating one or more records that include any and/or all of the registration information received from client computing device 150 and/or client augmented reality device 160.

Figure 2B:
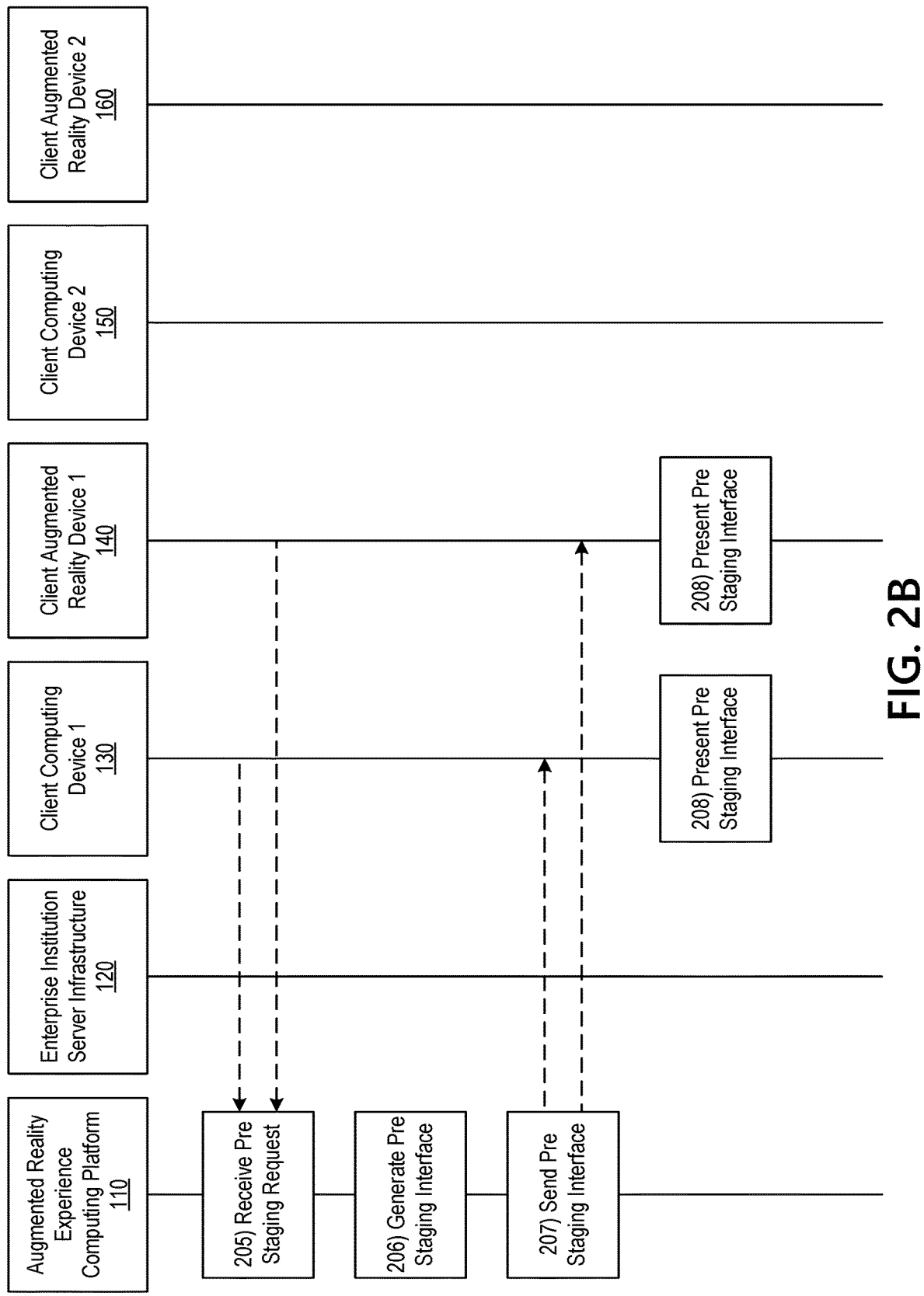

Referring to FIG. 2B, at step 205, augmented reality experience computing platform 110 may receive a pre-staging request from client computing device 130 and/or client augmented reality device 140. For example, at step 205, augmented reality experience computing platform 110 may receive, via the communication interface (e.g., communication interface 113), from the least one client device (e.g., client computing device 130, client augmented reality device 140) associated with the first event participant, an event pre-staging request. For instance, the event pre-staging request may correspond to or include information indicating a user request to view a menu of items available for pre-ordering before a user of client computing device 130 and/or client augmented reality device 140 arrives at a particular location, such as a retail store, a restaurant, a banking center, or another enterprise location.

At step 206, augmented reality experience computing platform 110 may generate a pre-staging user interface (e.g., based on any and/or all of the information received by augmented reality experience computing platform 110 with the pre-staging request). For example, at step 206, in response to receiving the event pre-staging request from the at least one client device (e.g., client computing device 130, client augmented reality device 140) associated with the first event participant, augmented reality experience computing platform 110 may generate a pre-staging interface for the at least one client device (e.g., client computing device 130, client augmented reality device 140) associated with the first event participant. For instance, augmented reality experience computing platform 110 may create and/or otherwise generate this pre-staging interface and/or any and/or all of the one or more other user interfaces described herein based on one or more user interface templates that are stored and/or maintained by augmented reality experience computing platform 110.

At step 207, augmented reality experience computing platform 110 may send the pre-staging user interface to client computing device 130 and/or client augmented reality device 140. For example, at step 207, augmented reality experience computing platform 110 may send, via the communication interface (e.g., communication interface 113), to the at least one client device (e.g., client computing device 130, client augmented reality device 140) associated with the first event participant, the pre-staging interface generated for the at least one client device (e.g., client computing device 130, client augmented reality device 140) associated with the first event participant. By sending the pre-staging user interface to client computing device 130 and/or client augmented reality device 140, augmented reality experience computing platform 110 may cause client computing device 130 and/or client augmented reality device 140 to display the pre-staging user interface and/or one or more augmented reality user interface elements associated with the pre-staging user interface. The one or more augmented reality user interface elements that may be associated with the pre-staging user interface and/or that may be associated with any and/or all of the one or more other user interfaces described herein may be displayed as an overlay on real-world elements which may be visible through one or more transparent and/or translucent display elements of a dedicated augmented reality device (e.g., client augmented reality device 140). Additionally or alternatively, the one or more augmented reality user interface elements that may be associated with the pre-staging user interface and/or that may be associated with any and/or all of the one or more other user interfaces described herein may be displayed as an overlay on real-world elements which may be visible in graphical layers behind and/or adjacent to other display elements presented on a display screen of a computing device (e.g., client computing device 130).

Figure 3:
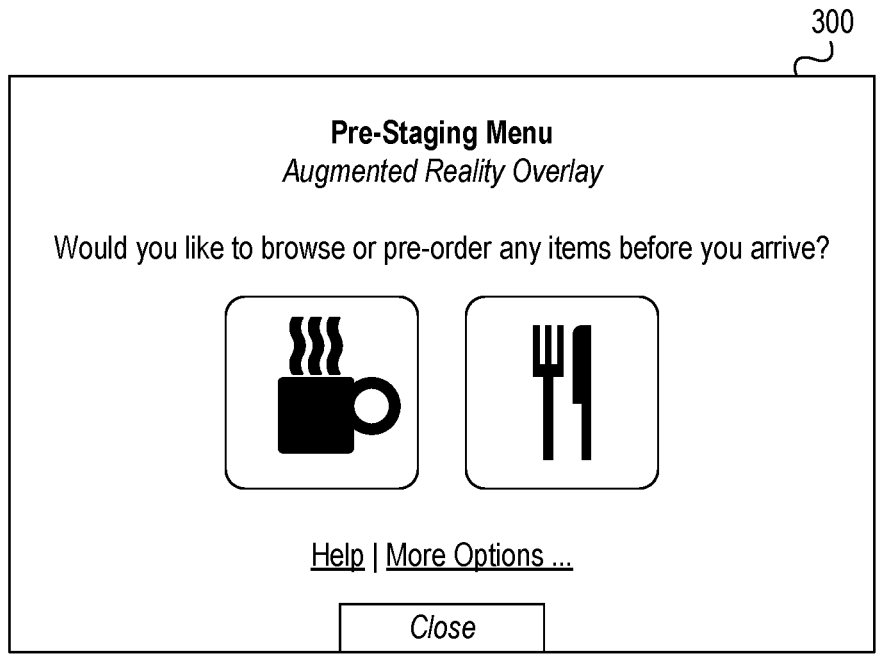
FIGS. 3-6 depict example graphical user interfaces for providing augmented reality user interfaces and controlling back-office data processing systems based on augmented reality events in accordance with one or more example embodiments.

At step 208, client computing device 130 and/or client augmented reality device 140 may present the pre-staging user interface. For example, by sending the pre-staging interface to client computing device 130 and/or client augmented reality device 140, augmented reality experience computing platform 110 may cause client computing device 130 and/or client augmented reality device 140 to display and/or otherwise present a graphical user interface similar to graphical user interface 300, which is illustrated in FIG. 3. As seen in FIG. 3, graphical user interface 300 may include a pre-staging menu that may include one or more user-selectable options that allow the user of client computing device 130 and/or client augmented reality device 140 to pre-order one or more items and/or otherwise pre-stage an event before arriving at a location. In addition, graphical user interface 300 may be displayed as an overlay on real-world elements that may be presented on a display screen of a computing device (e.g., of client computing device 130) and/or that may be visible through one or more transparent and/or translucent display elements of a dedicated augmented reality device (e.g., client augmented reality device 140). In some instances, graphical user interface 300 may include one or more user-selectable options that allow the user of client computing device 130 and/or client augmented reality device 140 to view one or more menu items available at a restaurant so as to pre-stage an order in the AR interface prior to arriving at the restaurant. In some instances, some options may be filtered or hidden and/or other options may be emphasized based on a user's stored dietary preferences (which may, e.g., be indicated in and/or obtained from user profile information maintained by augmented reality experience computing platform 110).

Figure 2C:
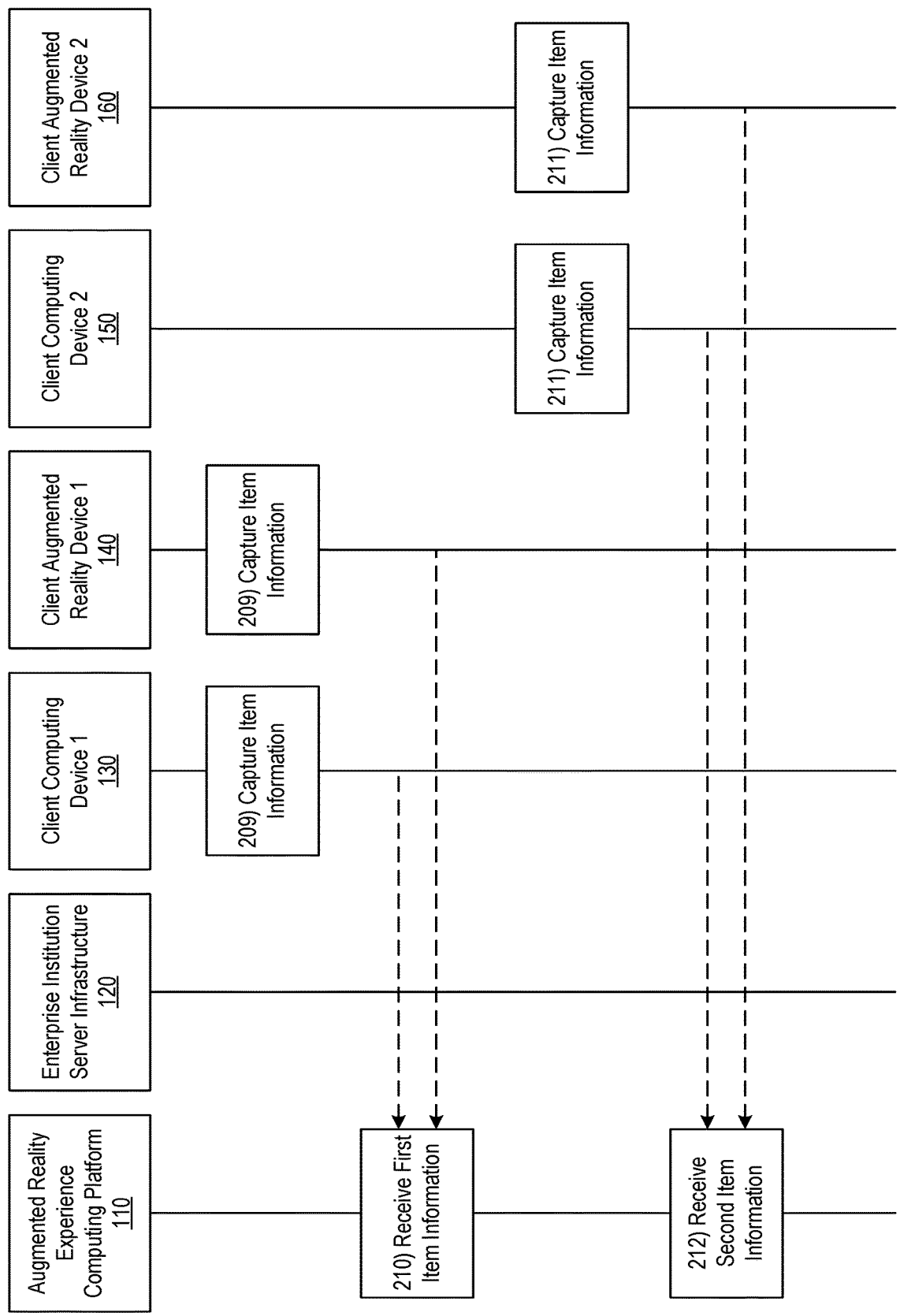

Referring to FIG. 2C, at step 209, client computing device 130 and/or client augmented reality device 140 may capture item information. For instance, client computing device 130 and/or client augmented reality device 140 may identify, record, and/or otherwise capture one or more items being ordered, requested, consumed, and/or otherwise used by one or more particular persons in connection with a particular event, such as a meal or meeting involving the user of client computing device 130 and client augmented reality device 140 and/or one or more other users of other devices (which may, e.g., enable augmented reality experience computing platform 110 to track such items and/or automatically split and/or share responsibilities for such items among the group, as illustrated below).

At step 210, augmented reality experience computing platform 110 may receive item information from client computing device 130 and/or client augmented reality device 140 (e.g., any and/or all of the item information captured by client computing device 130 and/or client augmented reality device 140 at step 209). For example, at step 210, augmented reality experience computing platform 110 may receive, via the communication interface (e.g., communication interface 113), from at least one client device (e.g., client computing device 130, client augmented reality device 140) associated with a first event participant, first item information identifying one or more items associated with the first event participant. For instance, the first item information identifying the one or more items associated with the first event participant may include and/or indicate one or more items ordered, requested, consumed, and/or otherwise used by the first event participant (who may, e.g., be the user of client computing device 130 and client augmented reality device 140). For instance, in the example context of a meal at a restaurant with other persons, the first item information may identify one or more items ordered, requested, consumed, and/or otherwise used by the user of client computing device 130 and client augmented reality device 140. This may enable augmented reality experience computing platform 110 to track such items and, for instance, automatically split the check among the user of client computing device 130 and client augmented reality device 140 and one or more other persons present in the example context of a meal at a restaurant. In some instances, client computing device 130, client augmented reality device 140, and/or augmented reality experience computing platform 110 may capture such item information based on users and/or others ordering items on their augmented reality devices and/or other computing devices. Additionally or alternatively, client computing device 130, client augmented reality device 140, and/or augmented reality experience computing platform 110 may capture such item information based on camera tracking of items being ordered, requested, consumed, and/or otherwise used (e.g., using object recognition techniques, facial recognition techniques, and/or the like). Additionally or alternatively, client computing device 130, client augmented reality device 140, and/or augmented reality experience computing platform 110 may capture such item information based on audio tracking of items being ordered, requested, consumed, and/or otherwise used (e.g., using natural language processing techniques, and/or the like).

In some embodiments, receiving the first item information identifying the one or more items associated with the first event participant from the at least one client device associated with the first event participant may include receiving a first portion of the first item information from a client computing device associated with the first event participant and receiving a second portion of the first item information from an augmented reality device associated with the first event participant. For example, in receiving the first item information identifying the one or more items associated with the first event participant from the at least one client device (e.g., client computing device 130, client augmented reality device 140) associated with the first event participant, augmented reality experience computing platform 110 may receive a first portion of the first item information from a client computing device (e.g., client computing device 130) associated with the first event participant and may receive a second portion of the first item information from an augmented reality device (e.g., client augmented reality device 140) associated with the first event participant. For instance, augmented reality experience computing platform 110 may receive different portions of the first item information from client computing device 130 and client augmented reality device 140, and augmented reality experience computing platform 110 may combine and/or otherwise use this information (e.g., when identifying what items were ordered, requested, consumed, and/or otherwise used by the first event participant during the event).

In some embodiments, receiving the first item information identifying the one or more items associated with the first event participant may include receiving information identifying at least one item that was captured and identified by the at least one client device associated with the first event participant using an integrated camera. For example, in receiving the first item information identifying the one or more items associated with the first event participant, augmented reality experience computing platform 110 may receive information identifying at least one item that was captured and identified by the at least one client device (e.g., client computing device 130, client augmented reality device 140) associated with the first event participant using an integrated camera (which may, e.g., be built into, connected to, and/or otherwise coupled to client computing device 130 and/or client augmented reality device 140, and which may, e.g., capture images and/or video of the first event participant and/or other event participants consuming and/or otherwise using items during the event).

In some embodiments, receiving the first item information identifying the one or more items associated with the first event participant may include receiving information identifying at least one item that was captured and identified by the at least one client device associated with the first event participant using natural language processing. For example, in receiving the first item information identifying the one or more items associated with the first event participant, augmented reality experience computing platform 110 may receive information identifying at least one item that was captured and identified by the at least one client device (e.g., client computing device 130, client augmented reality device 140) associated with the first event participant using natural language processing (e.g., based on audio of the first event participant and/or other event participants speaking when ordering, requesting, consuming, and/or otherwise using items during the event).

At step 211, client computing device 150 and/or client augmented reality device 160 may capture item information. For instance, client computing device 150 and/or client augmented reality device 160 may identify, record, and/or otherwise capture one or more items being ordered, requested, consumed, and/or otherwise used by one or more particular persons in connection with the same event as in the examples above, similar to how client computing device 130 and/or client augmented reality device 140 may capture such item information. For instance, client computing device 150 and/or client augmented reality device 160 may identify, record, and/or otherwise capture one or more items being ordered, requested, consumed, and/or otherwise used by one or more particular persons in connection with the same meal or meeting involving the user of client computing device 130 and client augmented reality device 140 (in addition to the user of client computing device 150 and client augmented reality device 160) and/or one or more other users of other devices (which may, e.g., enable augmented reality experience computing platform 110 to track such items and/or automatically split and/or share responsibilities for such items among the group).

At step 212, augmented reality experience computing platform 110 may receive item information from client computing device 150 and/or client augmented reality device 160 (e.g., any and/or all of the item information captured by client computing device 150 and/or client augmented reality device 160 at step 211). For example, at step 212, augmented reality experience computing platform 110 may receive, via the communication interface (e.g., communication interface 113), from at least one client device (e.g., client computing device 150, client augmented reality device 160) associated with a second event participant, second item information identifying one or more items associated with the second event participant. For instance, the second item information identifying the one or more items associated with the second event participant may include and/or indicate one or more items ordered, requested, consumed, and/or otherwise used by the second event participant (who may, e.g., be the user of client computing device 150 and client augmented reality device 160). For instance, in the example context of the same meal at the restaurant with other persons as in the examples above, the second item information may identify one or more items ordered, requested, consumed, and/or otherwise used by the user of client computing device 150 and client augmented reality device 160. This may enable augmented reality experience computing platform 110 to track such items and, for instance, automatically split the check among the user of client computing device 150 and client augmented reality device 160 and one or more other persons present (which may, e.g., include the user of client computing device 150 and client augmented reality device 160). In some instances, client computing device 150, client augmented reality device 160, and/or augmented reality experience computing platform 110 may capture such item information based on users and/or others ordering items on their augmented reality devices and/or other computing devices. Additionally or alternatively, client computing device 150, client augmented reality device 160, and/or augmented reality experience computing platform 110 may capture such item information based on camera tracking of items being ordered, requested, consumed, and/or otherwise used (e.g., using object recognition techniques, facial recognition techniques, and/or the like). Additionally or alternatively, client computing device 150, client augmented reality device 160, and/or augmented reality experience computing platform 110 may capture such item information based on audio tracking of items being ordered, requested, consumed, and/or otherwise used (e.g., using natural language processing techniques, and/or the like).

In some embodiments, receiving the second item information identifying the one or more items associated with the second event participant from the at least one client device associated with the second event participant may include receiving a first portion of the second item information from a client computing device associated with the second event participant and receiving a second portion of the second item information from an augmented reality device associated with the second event participant. For example, in receiving the second item information identifying the one or more items associated with the second event participant from the at least one client device (e.g., client computing device 150, client augmented reality device 160) associated with the second event participant, augmented reality experience computing platform 110 may receive a first portion of the second item information from a client computing device (e.g., client computing device 150) associated with the second event participant and may receive a second portion of the second item information from an augmented reality device (e.g., client augmented reality device 160) associated with the second event participant. For instance, augmented reality experience computing platform 110 may receive different portions of the second item information from client computing device 150 and client augmented reality device 160, and augmented reality experience computing platform 110 may combine and/or otherwise use this information (e.g., when identifying what items were ordered, requested, consumed, and/or otherwise used by the second event participant during the event).

Figure 2D:
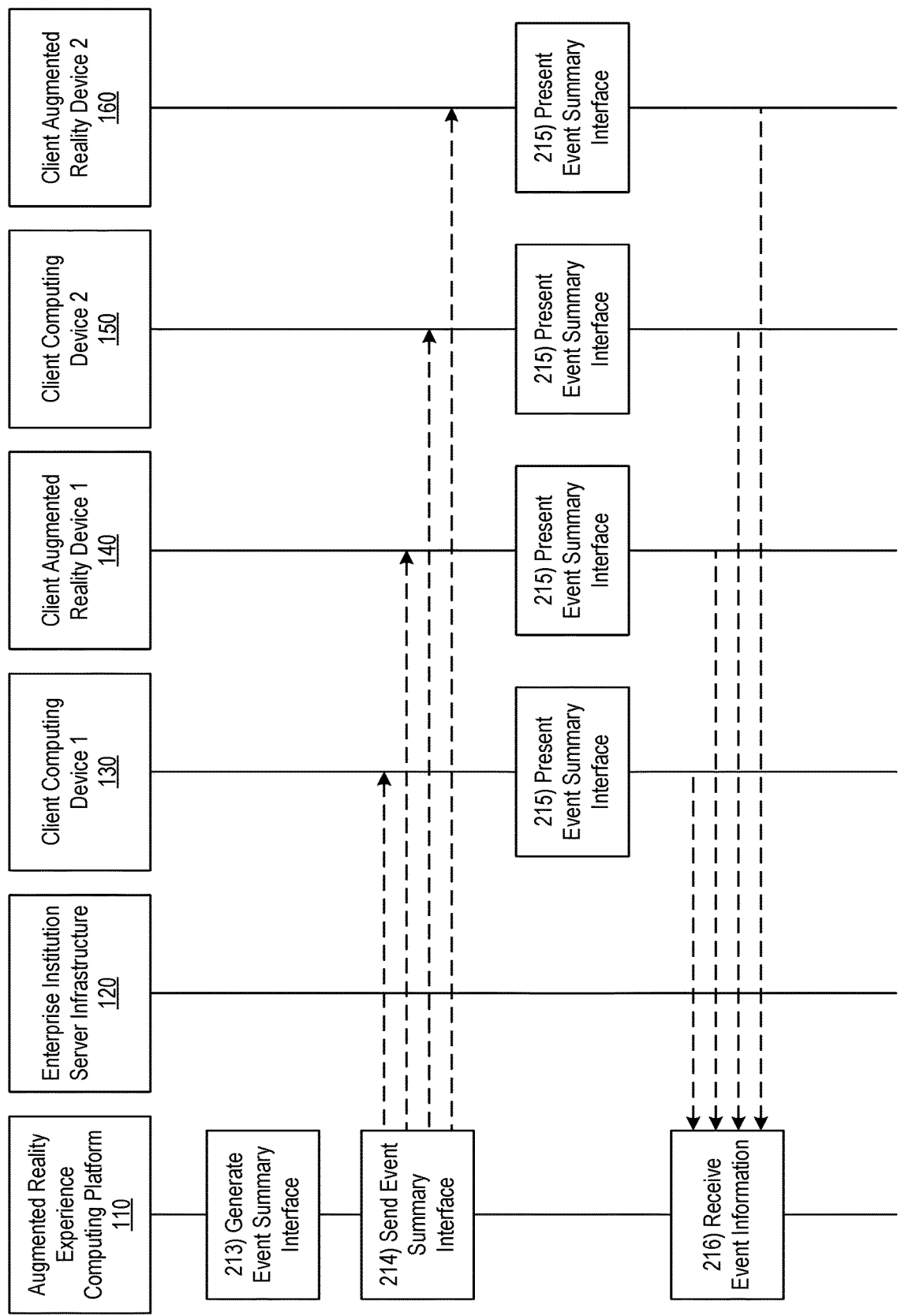

Referring to FIG. 2D, at step 213, augmented reality experience computing platform 110 may generate an event summary interface. For example, at step 213, augmented reality experience computing platform 110 may generate at least one event summary user interface based on the first item information identifying the one or more items associated with the first event participant (who may, e.g., be using client computing device 130 and/or client augmented reality device 140) and the second item information identifying the one or more items associated with the second event participant (who may, e.g., be using client computing device 150 and/or client augmented reality device 160). In some instances, augmented reality experience computing platform 110 may create and/or otherwise generate the event summary interface based on one or more user interface templates that are stored and/or maintained by augmented reality experience computing platform 110. In addition, the event summary interface may, for example, enable the event participants to organize and/or sort one or more items associated with the event (e.g., to split up items ordered, requested, consumed, and/or otherwise used during the event, so as to split the check for the meal in the restaurant example above, for instance).

At step 214, augmented reality experience computing platform 110 may send the event summary interface to client computing device 130, client augmented reality device 140, client computing device 150, and/or client augmented reality device 160. For example, at step 214, augmented reality experience computing platform 110 may send, via the communication interface (e.g., communication interface 113), to the at least one client device associated with the first event participant (e.g., client computing device 130 and/or client augmented reality device 140) and the at least one client device associated with the second event participant (e.g., client computing device 150 and/or client augmented reality device 160), the at least one event summary user interface, and the at least one event summary user interface may include one or more augmented reality overlay elements. For instance, the at least one event summary user interface may include one or more augmented reality overlay elements that may be presented on a display screen of a computing device (e.g., of client computing device 130 and/or client computing device 150) and/or that may be visible through one or more transparent and/or translucent display elements of a dedicated augmented reality device (e.g., client augmented reality device 140 and/or client augmented reality device 160). The one or more augmented reality overlay elements may, for instance, be two-dimensional objects, three-dimensional objects, highlights, shadows, and/or other graphical elements that may be generated by augmented reality experience computing platform 110 based on one or more augmented reality object templates (which may, e.g., be stored and/or maintained by augmented reality experience computing platform 110 and/or enterprise institution server infrastructure 120) and/or based on information associated with the event (which may, e.g., be received from client computing device 130, client augmented reality device 140, client computing device 150, and/or client augmented reality device 160).

In some embodiments, sending the at least one event summary user interface to the at least one client device associated with the first event participant and the at least one client device associated with the second event participant may cause at least one augmented reality device to display the one or more augmented reality overlay elements associated with the at least one event summary user interface on top of one or more real-world visual elements. For example, by sending the at least one event summary user interface to the at least one client device associated with the first event participant (e.g., client computing device 130 and/or client augmented reality device 140) and the at least one client device associated with the second event participant (e.g., client computing device 150 and/or client augmented reality device 160), augmented reality experience computing platform 110 may cause at least one augmented reality device (e.g., client augmented reality device 140, client augmented reality device 160) to display the one or more augmented reality overlay elements associated with the at least one event summary user interface on top of one or more real-world visual elements. For instance, augmented reality experience computing platform 110 may cause client augmented reality device 140 and/or client augmented reality device 160 to display and/or otherwise present one or more two-dimensional objects, three-dimensional objects, highlights, shadows, and/or other graphical elements that may be generated by augmented reality experience computing platform 110 as part of the event summary interface.

In some embodiments, sending the at least one event summary user interface to the at least one client device associated with the first event participant and the at least one client device associated with the second event participant may include synchronizing user interactions made on different devices by updating the at least one event summary user interface in real-time. For example, in sending the at least one event summary user interface to the at least one client device associated with the first event participant (e.g., client computing device 130, client augmented reality device 140) and the at least one client device associated with the second event participant (e.g., client computing device 150, client augmented reality device 160), augmented reality experience computing platform 110 may synchronize user interactions made on different devices by updating the at least one event summary user interface in real-time. For instance, in synchronizing user interactions made on different devices, augmented reality experience computing platform 110 may re-generate and/or otherwise update the event summary user interface being shared with and/or otherwise sent to client computing device 130, client augmented reality device 140, client computing device 150, client augmented reality device 160, and/or one or more other devices. In particular, augmented reality experience computing platform 110 may re-generate and/or otherwise update the event summary user interface such that interactions with augmented reality objects and/or other display elements made by one user on one device (e.g., client augmented reality device 140) may be displayed and/or otherwise reflected in the interface and/or perspective shown to other users and/or other devices (e.g., client computing device 130, client computing device 150, client augmented reality device 160) so as to provide a common augmented reality experience to different users of different devices. For instance, if the user of client computing device 130 moves a particular augmented reality object in space (e.g., by grabbing, pushing, and/or otherwise selecting and moving the object) and/or otherwise changes a particular augmented reality object (e.g., by creating, hiding, and/or modifying one or more details and/or other elements associated with the object), this movement and/or these changes may be received and/or otherwise captured by augmented reality experience computing platform 110, and augmented reality experience computing platform 110 then may generate an updated interface reflecting this movement and/or these changes and share the updated interface with client augmented reality device 140, client computing device 150, and client augmented reality device 160 (as well as with client computing device 130).

In some embodiments, the at least one event summary user interface may include one or more common elements and one or more participant-specific elements. For example, the at least one event summary user interface (which may, e.g., be generated by augmented reality experience computing platform 110 at step 213 and sent by augmented reality experience computing platform 110 at step 214) may include one or more common elements (which may, e.g., be displayed and/or otherwise presented to all users and/or devices associated with the event, such as client computing device 130, client augmented reality device 140, client computing device 150, and client augmented reality device 160, in the same manner) and one or more participant-specific elements (which might, e.g., be displayed and/or otherwise presented only to specific users and/or devices associated with the event). For instance, the at least one event summary user interface (which may, e.g., be generated by augmented reality experience computing platform 110 at step 213 and sent by augmented reality experience computing platform 110 at step 214) may include a common view of one or more two-dimensional objects, three-dimensional objects, highlights, shadows, and/or other graphical elements (which may, e.g., correspond to particular items associated with the event), as well as a user-specific view of user account information, user profile information, and/or other user-specific information, as illustrated in the sample user interfaces described below.

Figure 4:
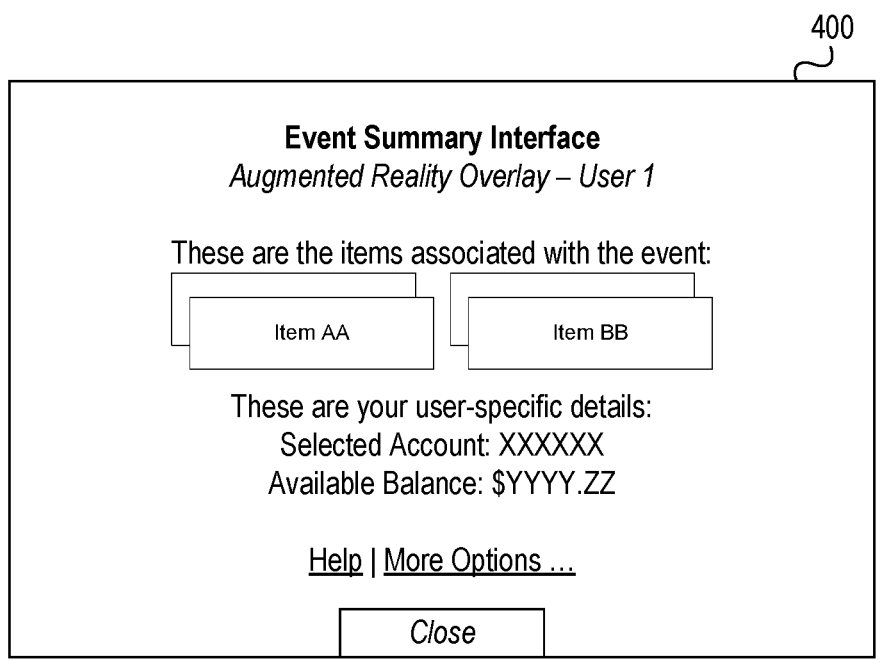
Figure 5:
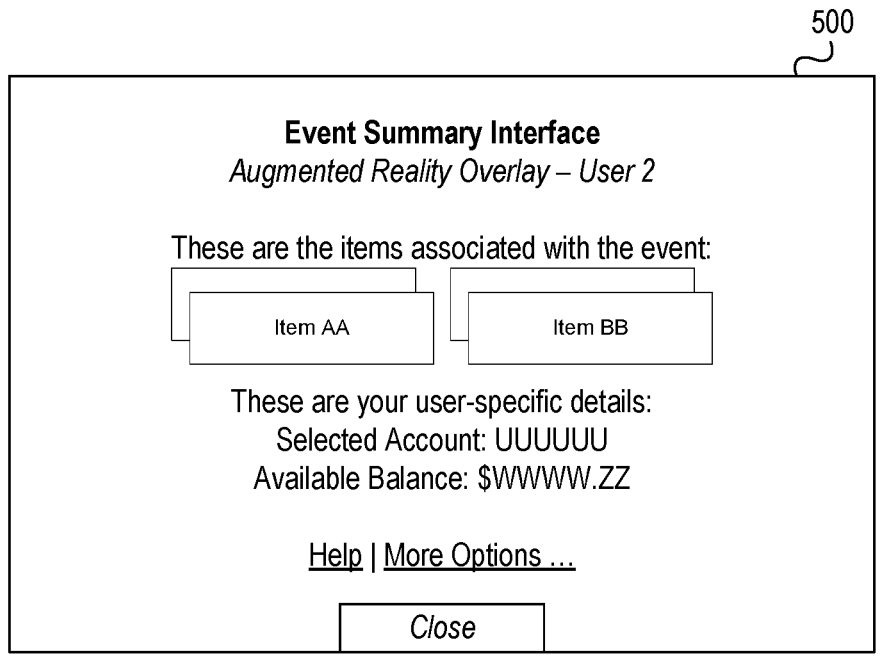

At step 215, client computing device 130, client augmented reality device 140, client computing device 150, and/or client augmented reality device 160 may present an event summary interface (e.g., the event summary interface sent by augmented reality experience computing platform 110). For example, by sending the event summary interface to client computing device 130, client augmented reality device 140, client computing device 150, and/or client augmented reality device 160, augmented reality experience computing platform 110 may cause client computing device 130, client augmented reality device 140, client computing device 150, and/or client augmented reality device 160 to display and/or otherwise present a graphical user interface similar to graphical user interface 400, which is illustrated in FIG. 4, and/or graphical user interface 500, which is illustrated in FIG. 5. In the illustrated examples, client computing device 130 and/or client augmented reality device 140 may display and/or otherwise present graphical user interface 400 (which may, e.g., be generated for and/or otherwise associated with the first event participant) and client computing device 150 and/or client augmented reality device 160 may display and/or otherwise present graphical user interface 500 (which may, e.g., be generated for and/or otherwise associated with the second event participant). As seen in FIG. 4, graphical user interface 400 may include one or more common two-dimensional objects, three-dimensional objects, highlights, shadows, and/or other graphical elements that correspond to particular items associated with the event (e.g., "Item AA," "Item BB"). These common graphical elements may be part of the shared or common view described above (which may, e.g., be visible to the second event participant and/or other event participants). In addition, graphical user interface 400 may include one or more user-specific two-dimensional objects, three-dimensional objects, highlights, shadows, and/or other graphical elements that correspond to user account information, user profile information, and/or other user-specific information (e.g., "Selected Account: XXXXXX," "Available Balance: $YYYY.ZZ"). These user-specific graphical elements might not be part of the shared or common view described above, and thus might not be visible to the second event participant and/or other event participants. In addition, any and/or all of the two-dimensional objects, three-dimensional objects, highlights, shadows, and/or other graphical elements included in graphical user interface 400 may be presented as augmented reality display elements, and graphical user interface 400 may be displayed as an overlay on real-world elements that may be presented on a display screen of a computing device (e.g., of client computing device 130) and/or that may be visible through one or more transparent and/or translucent display elements of a dedicated augmented reality device (e.g., client augmented reality device 140).

As seen in FIG. 5, graphical user interface 500 also may include one or more common two-dimensional objects, three-dimensional objects, highlights, shadows, and/or other graphical elements that correspond to particular items associated with the event (e.g., "Item AA," "Item BB"). These common graphical elements may be part of the shared or common view described above (which may, e.g., be visible to the first event participant and/or other event participants). In addition, graphical user interface 500 may include one or more user-specific two-dimensional objects, three-dimensional objects, highlights, shadows, and/or other graphical elements that correspond to user account information, user profile information, and/or other user-specific information (e.g., "Selected Account: UUUUUU," "Available Balance: $WWWW.ZZ"). These user-specific graphical elements might not be part of the shared or common view described above, and thus might not be visible to the first event participant and/or other event participants. In addition, any and/or all of the two-dimensional objects, three-dimensional objects, highlights, shadows, and/or other graphical elements included in graphical user interface 500 may be presented as augmented reality display elements, and graphical user interface 500 may be displayed as an overlay on real-world elements that may be presented on a display screen of a computing device (e.g., of client computing device 150) and/or that may be visible through one or more transparent and/or translucent display elements of a dedicated augmented reality device (e.g., client augmented reality device 160).

For example, by generating and sending graphical user interface 400 to client computing device 130 and/or client augmented reality device 140, and by generating and sending graphical user interface 500 to client computing device 150 and/or client augmented reality device 160, augmented reality experience computing platform 110 may provide a shared augmented reality experience to the first event participant (who may, e.g., be using client computing device 130 and/or client augmented reality device 140) and the second event participant (who may, e.g., be using client computing device 150 and/or client augmented reality device 160). As each event participant interacts with any and/or all of the two-dimensional objects, three-dimensional objects, highlights, shadows, and/or other graphical elements included in the graphical user interfaces, augmented reality experience computing platform 110 may update the graphical user interfaces being shared with all event participants (and their corresponding devices) in real-time, so that one participant's interactions or changes are viewable by other participants. In this way, augmented reality experience computing platform 110 may provide an augmented reality experience in which different event participants, using different devices, may interact with the same set of augmented reality objects. For instance, in the restaurant example described above, augmented reality experience computing platform 110 may generate and send user interfaces for all of the event participants in which a stack of objects representing items ordered and consumed during the meal are visible, and if a specific participant grabs and moves a particular object in their AR interface (e.g., to claim the item corresponding to the object for purposes of settling the check for the meal), this movement and change to the particular object may be represented in an updated interface generated by augmented reality experience computing platform 110 and shared by augmented reality experience computing platform 110 with all of the event participants. In addition, and as illustrated above, some visual aspects may be user-specific and/or hidden, such as a particular user's payment method and/or account balances in the restaurant example described above.

Additionally or alternatively, the event summary interface (which may, e.g., be generated by augmented reality experience computing platform 110, as described above) may include a running total of items that have been claimed and/or unclaimed, as well as information indicating which event participants have claimed specific items. In some instances, the interface may include two-dimensional objects, three-dimensional objects, highlights, shadows, and/or other graphical elements representing specific payments methods, such that a user (e.g., of client computing device 130, client augmented reality device 140, client computing device 150, and/or client augmented reality device 160) can drag and drop an item in the interface onto an element representing a payment method to cause payment to be made from a corresponding account. Augmented reality experience computing platform 110 may receive and/or capture this interaction and subsequently may generate and send commands to cause the processing of the payment, as described in greater detail below. In a variation of the restaurant example described above in which not all event participants are in possession of AR devices, a camera on a particular user's AR device (e.g., client augmented reality device 140, client augmented reality device 160) may capture an image of all participants, recognize specific participants, cause augmented reality experience computing platform 110 to arrange a payment for the entire check to be made from a single participant's account, and generate and send charge request prompts to other participants to facilitate repayment of the single participant.

At step 216, augmented reality experience computing platform 110 may receive event information from client computing device 130, client augmented reality device 140, client computing device 150, and/or client augmented reality device 160. For instance, augmented reality experience computing platform 110 may receive event information from client computing device 130, client augmented reality device 140, client computing device 150, and/or client augmented reality device 160 based on user input received by client computing device 130, client augmented reality device 140, client computing device 150, and/or client augmented reality device 160 via and/or responsive to the event summary interface. For instance, augmented reality experience computing platform 110 may receive event information identifying and/or indicating specific interactions with specific two-dimensional objects, three-dimensional objects, highlights, shadows, and/or other graphical elements included in the graphical user interfaces described above, and these interactions may correspond to the event participants organizing and/or sorting the items associated with the event (e.g., to assign particular items to particular event participants, for instance, to indicate who ordered and/or consumed what, so as to settle the check for the meal in the restaurant example described above).

Referring to FIG. 2E, at step 217, augmented reality experience computing platform 110 may update the event summary interface. For instance, at step 217, augmented reality experience computing platform 110 may update the event summary interface based on the event information received from client computing device 130, client augmented reality device 140, client computing device 150, and/or client augmented reality device 160 identifying and/or indicating specific interactions with specific two-dimensional objects, three-dimensional objects, highlights, shadows, and/or other graphical elements, so as to provide a shared augmented reality experience to the first event participant (who may, e.g., be using client computing device 130 and/or client augmented reality device 140) and the second event participant (who may, e.g., be using client computing device 150 and/or client augmented reality device 160) as described above.

At step 218, augmented reality experience computing platform 110 may send the updated event summary interface to client computing device 130, client augmented reality device 140, client computing device 150, and/or client augmented reality device 160. At step 219, client computing device 130, client augmented reality device 140, client computing device 150, and/or client augmented reality device 160 may present the updated event summary interface. For example, by sending the updated event summary interface to client computing device 130, client augmented reality device 140, client computing device 150, and/or client augmented reality device 160, augmented reality experience computing platform 110 may cause client computing device 130, client augmented reality device 140, client computing device 150, and/or client augmented reality device 160 to display and/or otherwise present the updated event summary interface.

Figure 6:
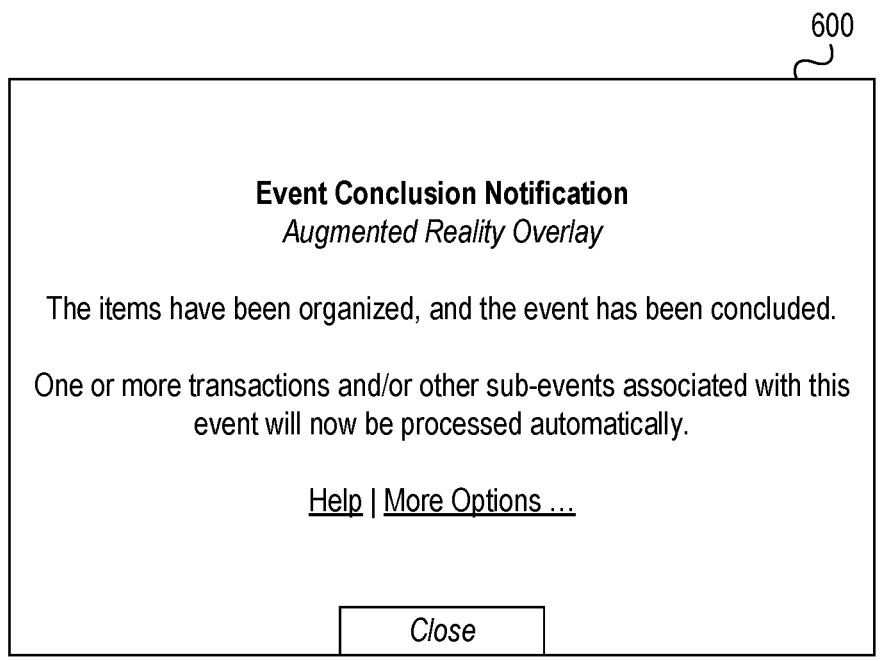

At step 220, augmented reality experience computing platform 110 may receive event conclusion information from client computing device 130, client augmented reality device 140, client computing device 150, and/or client augmented reality device 160. For example, at step 220, augmented reality experience computing platform 110 may receive, via the communication interface (e.g., communication interface 113), from one or more of the at least one client device associated with the first event participant (e.g., client computing device 130, client augmented reality device 140) and the at least one client device associated with the second event participant (e.g., client computing device 150, client augmented reality device 160), event conclusion information indicating an ending of an event involving the first event participant and the second event participant. For instance, the event conclusion information (which may, e.g., be received by augmented reality experience computing platform 110) may include information identifying a final list of one or more specific items associated with the event that have been assigned to specific event participants (which may, e.g., indicate who ordered and/or consumed what, so as to settle the check for the meal in the restaurant example described above). In some instances, in response to receiving such event conclusion information, augmented reality experience computing platform 110 may generate and send an event conclusion notification to one or more devices associated with the event (e.g., client computing device 130, client augmented reality device 140, client computing device 150, client augmented reality device 160), which may cause the one or more devices associated with the event (e.g., client computing device 130, client augmented reality device 140, client computing device 150, client augmented reality device 160) to display and/or otherwise present a graphical user interface similar to graphical user interface 600, which is illustrated in FIG. 6. As seen in FIG. 6, graphical user interface 600 may include information indicating that one or more specific items associated with the event that have been assigned to specific event participants (e.g., "The items have been organized, and the event has been concluded") and information indicating that augmented reality experience computing platform 110 may process and/or cause enterprise institution server infrastructure 120 to execute one or more sub-events (e.g., "One or more transactions and/or other sub-events associated with this event will now be processed automatically") as described below.

Referring to FIG. 2F, at step 221, augmented reality experience computing platform 110 may generate one or more event processing commands (e.g., based on the event conclusion information received at step 220 and/or based on other information received by augmented reality experience computing platform 110 from client computing device 130, client augmented reality device 140, client computing device 150, client augmented reality device 160, and/or other devices associated with the event). For example, at step 221, in response to receiving the event conclusion information indicating the ending of the event involving the first event participant and the second event participant, augmented reality experience computing platform 110 may generate one or more event processing commands directing enterprise institution server infrastructure (e.g., enterprise institution server infrastructure 120) to execute one or more sub-events. The one or more sub-events may, for instance, correspond to payment transactions to be executed based on the event conclusion information received at step 220 and/or based on other information received by augmented reality experience computing platform 110 from client computing device 130, client augmented reality device 140, client computing device 150, client augmented reality device 160, and/or other devices associated with the event. For instance, in the restaurant example described above, the one or more sub-events may, for instance, correspond to payment transactions to be executed that will cause the first event participant to be charged for items assigned to the first event participant (e.g., items ordered, requested, consumed, and/or otherwise used by the user of client computing device 130 and client augmented reality device 140), the second event participant to be charged for items assigned to the second event participant (e.g., items ordered, requested, consumed, and/or otherwise used by the user of client computing device 150 and client augmented reality device 160), and so on.

In some embodiments, generating the one or more event processing commands directing the enterprise institution server infrastructure to execute the one or more sub-events may include generating the one or more event processing commands based on first event information received from the at least one client device associated with the first event participant and second event information received from the at least one client device associated with the second event participant. For example, in generating the one or more event processing commands directing the enterprise institution server infrastructure (e.g., enterprise institution server infrastructure 120) to execute the one or more sub-events, augmented reality experience computing platform 110 may generate the one or more event processing commands based on first event information received from the at least one client device associated with the first event participant (e.g., client computing device 130, client augmented reality device 140) and second event information received from the at least one client device associated with the second event participant (e.g., client computing device 150, client augmented reality device 160). For instance, augmented reality experience computing platform 110 may generate the one or more event processing commands based on event information received from multiple different devices associated with multiple different event participants.

At step 222, augmented reality experience computing platform 110 may send the event processing commands to enterprise institution server infrastructure 120. For example, at step 222, enterprise institution server infrastructure 120 may send, via the communication interface (e.g., communication interface 113), to the enterprise institution server infrastructure (e.g., enterprise institution server infrastructure 120), the one or more event processing commands directing the enterprise institution server infrastructure (e.g., enterprise institution server infrastructure 120) to execute the one or more sub-events. For instance, by sending the one or more event processing commands to enterprise institution server infrastructure 120, augmented reality experience computing platform 110 may cause enterprise institution server infrastructure 120 to execute and/or otherwise process one or more payment transactions associated with the event (e.g., so as to settle the check for the meal in the restaurant example described above)

At step 223, enterprise institution server infrastructure 120 may receive the event processing commands from augmented reality experience computing platform 110. At step 224, enterprise institution server infrastructure 120 may execute the event processing commands (e.g., to execute and/or otherwise process one or more payment transactions associated with the event involving the users of client computing device 130, client augmented reality device 140, client computing device 150, and client augmented reality device 160).

Figure 7:
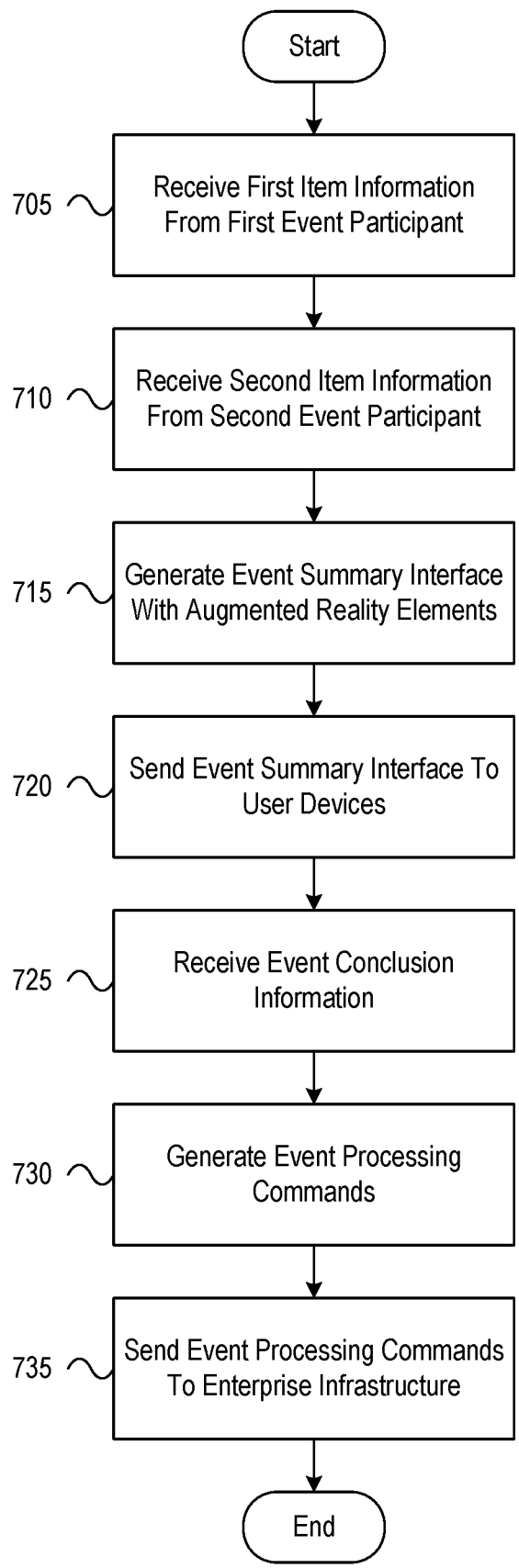
FIG. 7 depicts an illustrative method for providing augmented reality user interfaces and controlling back-office data processing systems based on augmented reality events in accordance with one or more example embodiments.

FIG. 7 depicts an illustrative method for providing augmented reality user interfaces and controlling back-office data processing systems based on augmented reality events in accordance with one or more example embodiments. Referring to FIG. 7, at step 705, a computing platform having at least one processor, a communication interface, and memory may receive, via the communication interface, from at least one client device associated with a first event participant, first item information identifying one or more items associated with the first event participant. At step 710, the computing platform may receive, via the communication interface, from at least one client device associated with a second event participant, second item information identifying one or more items associated with the second event participant. At step 715, the computing platform may generate at least one event summary user interface based on the first item information identifying the one or more items associated with the first event participant and the second item information identifying the one or more items associated with the second event participant. At step 720, the computing platform may send, via the communication interface, to the at least one client device associated with the first event participant and the at least one client device associated with the second event participant, the at least one event summary user interface, and the at least one event summary user interface may include one or more augmented reality overlay elements.

At step 725, the computing platform may receive, via the communication interface, from one or more of the at least one client device associated with the first event participant and the at least one client device associated with the second event participant, event conclusion information indicating an ending of an event involving the first event participant and the second event participant. At step 730, in response to receiving the event conclusion information indicating the ending of the event involving the first event participant and the second event participant, the computing platform may generate one or more event processing commands directing enterprise institution server infrastructure to execute one or more sub-events. At step 735, the computing platform may send, via the communication interface, to the enterprise institution server infrastructure, the one or more event processing commands directing the enterprise institution server infrastructure to execute the one or more sub-events.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, application-specific integrated circuits (ASICs), field programmable gate arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, and one or more depicted steps may be optional in accordance with aspects of the disclosure.

What is claimed is:

1. A computing platform, comprising:
   at least one processor;
   a communication interface communicatively coupled to the at least one processor; and
   memory storing computer-readable instructions that, when executed by the at least one processor, cause the computing platform to:
     receive, via the communication interface, from at least one client device associated with a first event participant, first item information identifying one or more items associated with the first event participant;
     receive, via the communication interface, from at least one client device associated with a second event participant, second item information identifying one or more items associated with the second event participant;
     generate at least one event summary user interface based on the first item information identifying the one or more items associated with the first event participant and the second item information identifying the one or more items associated with the second event participant;
     send, via the communication interface, to the at least one client device associated with the first event participant and the at least one client device associated with the second event participant, the at least one event summary user interface, wherein the at least one event summary user interface comprises one or more augmented reality overlay elements,
     wherein sending the at least one event summary user interface to the at least one client device associated with the first event participant and the at least one client device associated with the second event participant comprises synchronizing user interactions made on different devices by updating the at least one event summary user interface in real-time,
     wherein synchronizing the user interactions made on different devices by updating the at least one event summary user interface in real-time comprises generating an updated interface for a device associated with the first event participant, the updated interface reflecting a movement of at least one augmented reality object in space made on a device associated with the second event participant, and
     wherein the movement of the at least one augmented reality object in space made on the device associated with the second event participant corresponds to the second event participant grabbing and moving the at least one augmented reality object in space to claim an item corresponding to the at least one augmented reality object to settle a check for a meal;
     receive, via the communication interface, from one or more of the at least one client device associated with the first event participant and the at least one client device associated with the second event participant, event conclusion information indicating an ending of an event involving the first event participant and the second event participant;
     in response to receiving the event conclusion information indicating the ending of the event involving the first event participant and the second event participant, generate one or more event processing commands directing enterprise institution server infrastructure to execute one or more sub-events; and
     send, via the communication interface, to the enterprise institution server infrastructure, the one or more event processing commands directing the enterprise institution server infrastructure to execute the one or more sub-events.

2. The computing platform of claim 1, wherein receiving the first item information identifying the one or more items associated with the first event participant from the at least one client device associated with the first event participant comprises receiving a first portion of the first item information from a client computing device associated with the first event participant and receiving a second portion of the first item information from an augmented reality device associated with the first event participant.

3. The computing platform of claim 2, wherein receiving the second item information identifying the one or more items associated with the second event participant from the at least one client device associated with the second event participant comprises receiving a first portion of the second item information from a client computing device associated with the second event participant and receiving a second portion of the second item information from an augmented reality device associated with the second event participant.

4. The computing platform of claim 1, wherein sending the at least one event summary user interface to the at least one client device associated with the first event participant and the at least one client device associated with the second event participant causes at least one augmented reality device to display the one or more augmented reality overlay elements associated with the at least one event summary user interface on top of one or more real-world visual elements.

5. The computing platform of claim 1, wherein the at least one event summary user interface comprises one or more common elements and one or more participant-specific elements.

6. The computing platform of claim 1, wherein generating the one or more event processing commands directing the enterprise institution server infrastructure to execute the one or more sub-events comprises generating the one or more event processing commands based on first event information received from the at least one client device associated with the first event participant and second event information received from the at least one client device associated with the second event participant.

7. The computing platform of claim 1, wherein the memory stores additional computer-readable instructions that, when executed by the at least one processor, cause the computing platform to:
  prior to receiving the first item information identifying the one or more items associated with the first event participant:
    receive, via the communication interface, from the at least one client device associated with the first event participant, an event pre-staging request;
    in response to receiving the event pre-staging request from the at least one client device associated with the first event participant, generate a pre-staging interface for the at least one client device associated with the first event participant; and
    send, via the communication interface, to the at least one client device associated with the first event participant, the pre-staging interface generated for the at least one client device associated with the first event participant.

8. The computing platform of claim 1, wherein receiving the first item information identifying the one or more items associated with the first event participant comprises receiving information identifying at least one item that was captured and identified by the at least one client device associated with the first event participant using an integrated camera.

9. The computing platform of claim 1, wherein receiving the first item information identifying the one or more items associated with the first event participant comprises receiving information identifying at least one item that was captured and identified by the at least one client device associated with the first event participant using natural language processing.

10. The computing platform of claim 1, wherein the movement of the at least one augmented reality object in space made on the device associated with the second event participant corresponds to the second event participant grabbing and moving a first augmented reality object representing a food item onto a plate of the second event participant to claim the food item for payment.

11. The computing platform of claim 10, wherein the movement of the at least one augmented reality object in space made on the device associated with the second event participant corresponds to the second event participant grabbing and moving a second augmented reality object representing a drink item onto the plate of the second event participant to claim the drink item for payment.

12. A method, comprising:
  at a computing platform comprising at least one processor, a communication interface, and memory:
    receiving, by the at least one processor, via the communication interface, from at least one client device associated with a first event participant, first item information identifying one or more items associated with the first event participant;
    receiving, by the at least one processor, via the communication interface, from at least one client device associated with a second event participant, second item information identifying one or more items associated with the second event participant;
    generating, by the at least one processor, at least one event summary user interface based on the first item information identifying the one or more items associated with the first event participant and the second item information identifying the one or more items associated with the second event participant;
    sending, by the at least one processor, via the communication interface, to the at least one client device associated with the first event participant and the at least one client device associated with the second event participant, the at least one event summary user interface, wherein the at least one event summary user interface comprises one or more augmented reality overlay elements,
      wherein sending the at least one event summary user interface to the at least one client device associated with the first event participant and the at least one client device associated with the second event participant comprises synchronizing user interactions made on different devices by updating the at least one event summary user interface in real-time,
      wherein synchronizing the user interactions made on different devices by updating the at least one event summary user interface in real-time comprises generating an updated interface for a device associated with the first event participant, the updated interface reflecting a movement of at least one augmented reality object in space made on a device associated with the second event participant, and
      wherein the movement of the at least one augmented reality object in space made on the device associated with the second event participant corresponds to the second event participant grabbing and moving the at least one augmented reality object in space to claim an item corresponding to the at least one augmented reality object to settle a check for a meal;
    receiving, by the at least one processor, via the communication interface, from one or more of the at least one client device associated with the first event participant and the at least one client device associated with the second event participant, event conclusion information indicating an ending of an event involving the first event participant and the second event participant;
    in response to receiving the event conclusion information indicating the ending of the event involving the first event participant and the second event participant, generating, by the at least one processor, one or more event processing commands directing enterprise institution server infrastructure to execute one or more sub-events; and
    sending, by the at least one processor, via the communication interface, to the enterprise institution server infrastructure, the one or more event processing commands directing the enterprise institution server infrastructure to execute the one or more sub-events.

13. The method of claim 12, wherein receiving the first item information identifying the one or more items associated with the first event participant from the at least one client device associated with the first event participant comprises receiving a first portion of the first item information from a client computing device associated with the first event participant and receiving a second portion of the first item information from an augmented reality device associated with the first event participant.

14. The method of claim 13, wherein receiving the second item information identifying the one or more items associated with the second event participant from the at least one client device associated with the second event participant comprises receiving a first portion of the second item information from a client computing device associated with the second event participant and receiving a second portion of the second item information from an augmented reality device associated with the second event participant.

15. The method of claim 12, wherein sending the at least one event summary user interface to the at least one client device associated with the first event participant and the at least one client device associated with the second event participant causes at least one augmented reality device to display the one or more augmented reality overlay elements associated with the at least one event summary user interface on top of one or more real-world visual elements.

16. The method of claim 12, wherein the at least one event summary user interface comprises one or more common elements and one or more participant-specific elements.

17. The method of claim 12, wherein generating the one or more event processing commands directing the enterprise institution server infrastructure to execute the one or more sub-events comprises generating the one or more event processing commands based on first event information received from the at least one client device associated with the first event participant and second event information received from the at least one client device associated with the second event participant.

18. The method of claim 12, comprising:
  prior to receiving the first item information identifying the one or more items associated with the first event participant:
    receiving, by the at least one processor, via the communication interface, from the at least one client device associated with the first event participant, an event pre-staging request;
    in response to receiving the event pre-staging request from the at least one client device associated with the first event participant, generating, by the at least one processor, a pre-staging interface for the at least one client device associated with the first event participant; and
    sending, by the at least one processor, via the communication interface, to the at least one client device associated with the first event participant, the pre-staging interface generated for the at least one client device associated with the first event participant.

19. The method of claim 12, wherein receiving the first item information identifying the one or more items associated with the first event participant comprises receiving information identifying at least one item that was captured and identified by the at least one client device associated with the first event participant using an integrated camera.

20. One or more non-transitory computer-readable media storing instructions that, when executed by a computing platform comprising at least one processor, a communication interface, and memory, cause the computing platform to:
  receive, via the communication interface, from at least one client device associated with a first event participant, first item information identifying one or more items associated with the first event participant;
  receive, via the communication interface, from at least one client device associated with a second event participant, second item information identifying one or more items associated with the second event participant;
  generate at least one event summary user interface based on the first item information identifying the one or more items associated with the first event participant and the second item information identifying the one or more items associated with the second event participant;
  send, via the communication interface, to the at least one client device associated with the first event participant and the at least one client device associated with the second event participant, the at least one event summary user interface, wherein the at least one event summary user interface comprises one or more augmented reality overlay elements,
    wherein sending the at least one event summary user interface to the at least one client device associated with the first event participant and the at least one client device associated with the second event participant comprises synchronizing user interactions made on different devices by updating the at least one event summary user interface in real-time,
    wherein synchronizing the user interactions made on different devices by updating the at least one event summary user interface in real-time comprises generating an updated interface for a device associated with the first event participant, the updated interface reflecting a movement of at least one augmented reality object in space made on a device associated with the second event participant, and
    wherein the movement of the at least one augmented reality object in space made on the device associated with the second event participant corresponds to the second event participant grabbing and moving the at least one augmented reality object in space to claim an item corresponding to the at least one augmented reality object to settle a check for a meal;
  receive, via the communication interface, from one or more of the at least one client device associated with the first event participant and the at least one client device associated with the second event participant, event conclusion information indicating an ending of an event involving the first event participant and the second event participant;
  in response to receiving the event conclusion information indicating the ending of the event involving the first event participant and the second event participant, generate one or more event processing commands directing enterprise institution server infrastructure to execute one or more sub-events; and
  send, via the communication interface, to the enterprise institution server infrastructure, the one or more event processing commands directing the enterprise institution server infrastructure to execute the one or more sub-events.

* * * * *